United States Patent
Yates

(10) Patent No.: US 10,450,889 B2
(45) Date of Patent: Oct. 22, 2019

(54) COMPRESSOR GEOMETRY CONTROL

(71) Applicant: ROLLS-ROYCE PLC, London (GB)

(72) Inventor: Martin Yates, East Haddon (GB)

(73) Assignee: ROLLS-ROYCE plc, Derby (GB)

( * ) Notice: Subject to any disclaimer, the term of this patent is extended or adjusted under 35 U.S.C. 154(b) by 433 days.

(21) Appl. No.: 15/485,496

(22) Filed: Apr. 12, 2017

(65) Prior Publication Data
US 2017/0356469 A1    Dec. 14, 2017

(30) Foreign Application Priority Data

Jun. 14, 2016 (GB) .................................. 1610312.9

(51) Int. Cl.
F01D 17/16 (2006.01)
F02C 6/08 (2006.01)
F02C 7/236 (2006.01)
F04D 27/00 (2006.01)
F04D 29/56 (2006.01)
F04D 31/00 (2006.01)
F01D 17/26 (2006.01)

(52) U.S. Cl.
CPC ........... F01D 17/162 (2013.01); F01D 17/26 (2013.01); F02C 6/08 (2013.01); F02C 7/2365 (2013.01); F04D 27/009 (2013.01); F04D 29/563 (2013.01); F04D 31/00 (2013.01); F05D 2220/32 (2013.01); F05D 2250/90 (2013.01)

(58) Field of Classification Search
CPC .......... F01D 17/10; F01D 17/12; F01D 17/14; F01D 17/16; F01D 17/162; F01D 17/26; F02C 6/08
See application file for complete search history.

(56) References Cited

U.S. PATENT DOCUMENTS

| 3,172,259 A | 3/1965 | North |
| 3,937,588 A | 2/1976 | Kisslan |
| 4,403,912 A * | 9/1983 | Pekari .................... F01D 17/162 415/150 |
| 4,720,237 A | 1/1988 | Weiner et al. |
| 5,993,152 A * | 11/1999 | Schilling ............... F01D 17/162 415/155 |
| 2007/0166150 A1* | 7/2007 | Szucs .................... F01D 17/162 415/160 |

(Continued)

FOREIGN PATENT DOCUMENTS

| EP | 0978772 A2 | 2/2000 |
| EP | 2657461 A2 | 10/2013 |
| GB | 2473578 A | 3/2011 |

Primary Examiner — Craig Kim
(74) Attorney, Agent, or Firm — Oliff PLC

(57) ABSTRACT

A system for controlling the geometry of a variable geometry compressor. The system having: a mechanical linkage operable to vary the compressor geometry; a first fluid-powered actuator arranged to operate the linkage and configured to be powered by a pressurized supply of an incompressible fluid; and a second fluid-powered actuator arranged to operate the linkage and configured to be powered by a pressurized supply of a compressible fluid. Wherein the first and second actuators are further arranged to operate in combination on the mechanical linkage such that a first actuator force exerted by the first actuator on the mechanical linkage sums with a second actuator force exerted by the second actuator on the mechanical linkage.

15 Claims, 3 Drawing Sheets

(56) References Cited

U.S. PATENT DOCUMENTS

| | | | |
|---|---|---|---|
| 2010/0223903 A1* | 9/2010 | Starr | F01D 17/141 |
| | | | 60/204 |
| 2010/0260591 A1* | 10/2010 | Martin | F01D 5/146 |
| | | | 415/1 |
| 2010/0286889 A1* | 11/2010 | Childers | F02C 6/08 |
| | | | 701/100 |
| 2011/0158792 A1* | 6/2011 | Andrus | F01D 17/162 |
| | | | 415/159 |
| 2012/0087780 A1* | 4/2012 | Suciu | F01D 17/162 |
| | | | 415/159 |
| 2015/0176418 A1* | 6/2015 | Marshall | F04D 29/544 |
| | | | 415/1 |
| 2015/0192075 A1 | 7/2015 | Griffiths | |
| 2015/0275916 A1* | 10/2015 | Marshall | F01D 17/162 |
| | | | 415/148 |
| 2015/0345323 A1* | 12/2015 | Craven | F04D 29/563 |
| | | | 415/1 |
| 2016/0061117 A1 | 3/2016 | Emmet et al. | |
| 2017/0183976 A1* | 6/2017 | Moniz | F01D 17/145 |

* cited by examiner

COMPRESSOR GEOMETRY CONTROL

FIELD OF THE INVENTION

The present invention relates to the control of a variable geometry compressor.

BACKGROUND

A compressor of a gas turbine engine typically has a row of inlet guide vanes and plural compressor stages, each stage comprising a set of stator vanes which receive and redirect the working fluid issuing from the rotating blades of the preceding stage. As aero engines have to operate at varying speeds and inlet conditions, it can be advantageous to be able to vary the geometry of the compressor e.g. to alter the aerodynamic flow angle of individual inlet guide vanes and stator vanes within the gas turbine annulus and/or to adjust compressor bleed valve settings, depending on the engine operating speed and conditions. Vanes whose flow angles are alterable in this way are known as variable vanes.

A large variety of systems are conventionally used for varying compressor geometry. For example, unison rings can be used to rotate variable vanes about their radial axes and thereby change the aerodynamic flow angle. Each unison ring encircles the engine and is rotated by one or more actuators to produce movement in the circumferential direction. This movement can be converted by an arrangement of levers and spindles into the rotation of the variable vanes.

It is known to use hydraulic actuators which use fuel as their hydraulic fluid (i.e. "fueldraulic" actuators) to control the compressor variable geometry. However in recent years there has been an increase in the level of actuation required in gas turbine engines, i.e. increases in both the number of actuators and the loads they have to produce.

One option for adapting fuel systems to meet future higher load requirements is to use larger fueldraulic actuators and larger servo-valves in conjunction with a higher minimum fuel pump pressure rise. However, raising the minimum pump pressure rise increases heat input to the fuel and increases the risk of damage to the pump bearings, which have to run on thinner bearing film thicknesses at high pressure, low speed conditions.

Another proposal, therefore, is to provide a separate fuel pump, such as an axial piston pump, to provide pressurised fuel to actuate auxiliary engine devices such as variable vanes and bleed valves. An example of an axial piston pump in such a fuel system is described in US 2015/0192075. However, this proposal significantly increases the complexity of the fuel system.

SUMMARY

It would be desirable to provide an alternative approach for controlling the geometry of a variable geometry compressor, and particularly an approach which can accommodate increased levels of actuation.

Accordingly, in a first aspect, the present invention provides a system for controlling the geometry of a variable geometry compressor, the system having:
 a mechanical linkage operable to vary the compressor geometry;
 a first fluid-powered actuator arrange to operate the linkage and configured to be powered by a pressurised supply of an incompressible fluid (e.g. fuel); and
 a second fluid-powered actuator arranged to operate the linkage and configured to be powered by a pressurised supply of a compressible fluid (e.g. air);
 wherein the first and second actuators are further arranged to operate in combination on the mechanical linkage such that a first actuator force exerted by the first actuator on the mechanical linkage sums with a second actuator force exerted by the second actuator on the mechanical linkage.

Advantageously, by combining the operations of the first and second actuators on the mechanical linkage, the level of actuation demanded from the incompressible fluid can be reduced.

In a second aspect, the invention provides a variable geometry compressor having the system as discussed above.

In a third aspect, the invention provides a gas turbine engine including the variable geometry compressor as discussed above.

In a fourth aspect, the invention provides a use of the system of the first aspect for controlling the geometry of a variable geometry compressor. In particular, a method of operating the system of the first aspect may include:
 supplying a compressible fluid to the second actuator such that the second actuator force is less than a threshold force required to operate the mechanical linkage; and
 supplying an incompressible fluid to the first actuator, such that the first actuator force and the second actuator force provide a total force which is greater than the threshold force.

Advantageously, this method can enable a fine degree of control of the mechanical linkage using the incompressible fluid, which does not have to provide all of the force required to overcome the threshold force.

Optional features of the invention will now be set out. These are applicable singly or in any combination with any aspect of the invention.

The mechanical linkage may only operate to vary the compressor geometry when an actuator force equal to or greater than a threshold actuator force is exerted on the linkage, and the second actuator may be arranged such that the second actuator force is less than the threshold actuator force. Alternatively, the system may further include a controller (e.g. an electronic engine controller (EEC) and suitable sensing/control lines), which may be arranged to control the second actuator such that the second actuator force exerted by the second actuator on the mechanical linkage is less than a threshold actuator force required to vary the compressor geometry. However, either way the system can thereby enable a fine degree of control of the mechanical linkage using the incompressible fluid, which does not have to provide all of the force required to overcome the threshold force. The controller may be further arranged to control the first and second actuator such that the magnitude of the first actuator force is less than the second actuator force. This also helps to reduce the level of actuation demanded from the incompressible fluid.

As mentioned above, the incompressible fluid may be fuel, and the compressible fluid may be air (e.g. compressed air bled from the, or another, compressor of the engine). Both of these fluids are conveniently available in gas turbine engines, and their properties are well understood at the appropriate pressures and temperatures.

The second actuator may be a non-flowing actuator (e.g. a non-flowing air actuator), such that the compressible fluid does not flow through the actuator. This can reduce the compressible fluid requirement of the second actuator.

Each of the actuators may have a respective piston-in-cylinder arrangement defining a first chamber for the respective fluid corresponding to a first direction of actuation and a second chamber for the respective fluid corresponding to an opposite second direction of actuation. When the respective fluid is supplied to the first chamber of one of the actuators, the other fluid may be supplied to the first chamber of the other actuator, such that the first and second actuator forces are exerted in the same direction of actuation. Alternatively, when the respective fluid is supplied to the first chamber of one of the actuators, the other fluid may be supplied to the second chamber of the other actuator, such that the first and second actuator forces are exerted in opposite directions of actuation. The first and second chambers of the second fluid actuator may be dimensioned such that the maximum magnitude of the second actuator force is less than the threshold actuator force.

The compressor may comprise one or more variable vanes, e.g. in one or more rows of variable vanes, and the actuators may vary the angle of the vanes. The mechanical linkage may include a unison ring. Indeed, the mechanical linkage may include plural unison rings ganged together such that the system controls two or more sets, e.g. rows, of variable vanes. Additionally or alternatively, the compressor may comprise one or more bleed valves and the actuators may vary the state of opening of the valves.

The pressurised supply of incompressible fluid to the first actuator may be controlled by a first control valve, and the pressurised supply of compressible fluid to the second actuator may be controlled by a second control valve. The second control valve may be a bistable valve, a multistate valve, or a continuously variable (regulating) valve. The first control valve may be controlled directly by a dedicated link to an EEC. The second control valve may also be controlled directly by a dedicated link to an EEC. Alternatively, it may be controlled indirectly by a mechanical, hydraulic or pneumatic link from the first control valve.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 1:
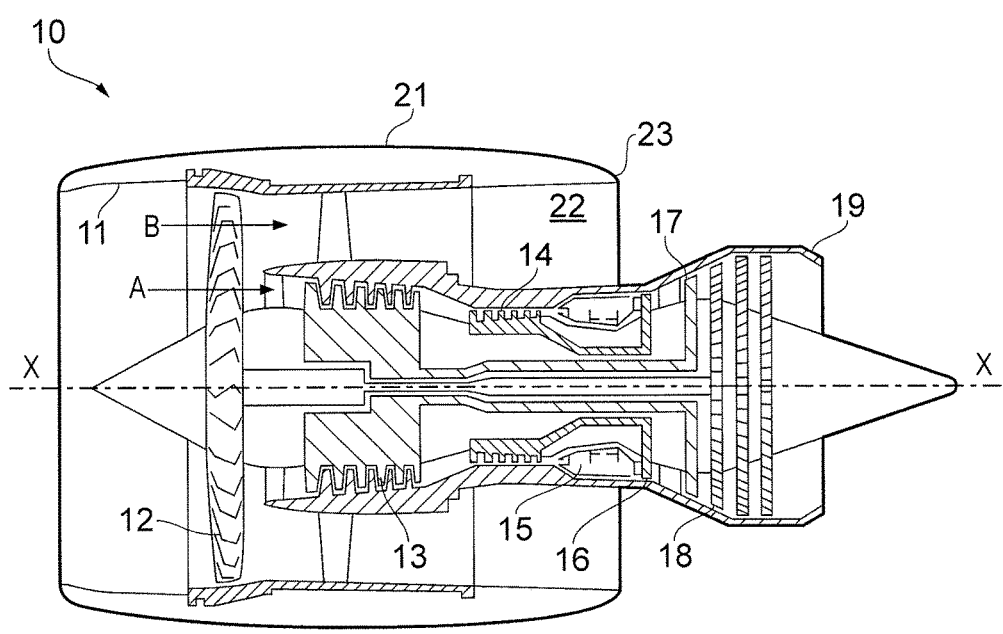
FIG. 1 shows a longitudinal cross-section through a ducted fan gas turbine engine.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Either or both of the compressors 13 and 14 may be variable geometry compressors. For example, the compressors may contain variable vanes whose angles relative to the incoming airflow may be varied and/or adjustable bleed valves.

Figure 2:
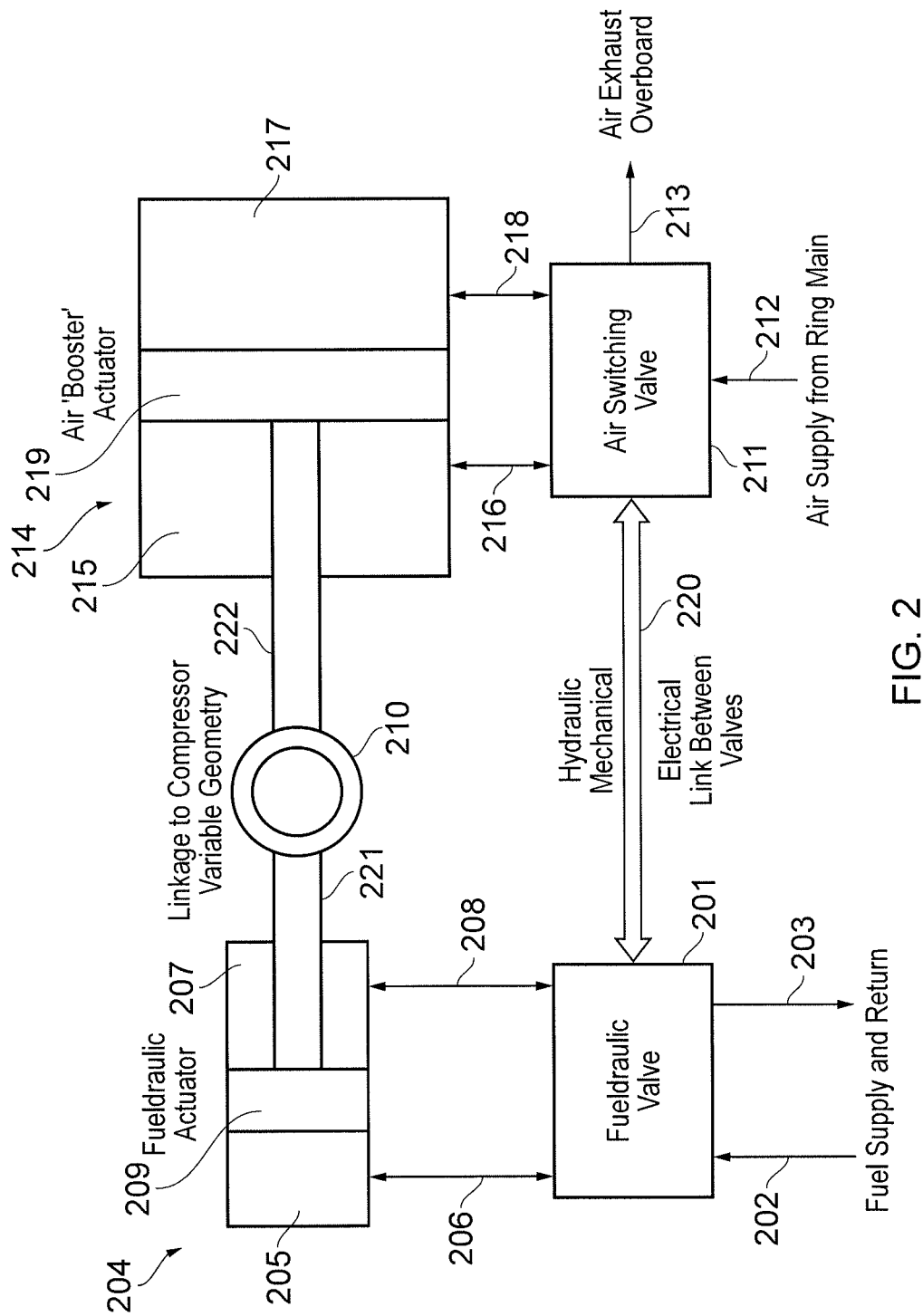
FIG. 2 shows a schematic of a system for controlling the geometry of a variable geometry compressor.

The geometry of such variable geometry compressors may be controlled through use of a system as shown in FIG. 2. The system includes a mechanical linkage 210 which may be connected to the variable vanes and/or bleed valves such that a fueldraulic actuator 204 and an air actuator 214 can adjust the vanes/valves through operation of the mechanical linkage. The mechanical linkage generally requires a threshold force to be applied before it will function, this threshold force may be a result of the inherent load on vanes/valves and mechanical losses in the linkage. The air actuator provides a pneumatic actuation force to supply some of the force required. However, accurate and rapid control of the vanes/valves can be required, and the inherent compressibility of air (even at high pressures) means that a pneumatic actuation force alone may be not suitable. But by providing the fueldraulic actuator as well, accurate positional control for the vanes/valves can be achieved.

The fueldraulic actuator 204 may comprise a piston 209, which is connected to a piston shaft 221 and sits within the actuator dividing it into a first chamber 205 and a second chamber 207, thereby providing a piston-in-cylinder arrangement. These chambers are respectively supplied with pressurised fuel by a first control line 206 and a second control line 208. By introducing the incompressible fluid, i.e. fuel, into these chambers the piston can be moved within the actuator, thereby exerting a first actuating force on the mechanical linkage 210. The control lines are connected to a fueldraulic valve 201, which is connected to a supply manifold 202 and a return manifold 203. The valve controls the supply of fuel from the supply manifold to the actuator chambers, as well as the flow of fuel from the actuator chambers to the return manifold. The supply and return manifolds connect to a fuel supply system for supplying pressurised fuel to burners of the gas turbine engine 10.

The air actuator 214 may also comprise a piston 219, which is connected to a piston shaft 222 and sits within the actuator and divides it into a first chamber 215 and a second chamber 217, thereby providing another piston-in-cylinder arrangement. The first chamber is supplied with compressed air by a first control line 216 and the second chamber is supplied with compressed air by a second control line 218. By introducing the compressible fluid, i.e. compressed air, into these chambers the piston can be moved within the actuator, thereby exerting a second actuating force on the mechanical linkage 210. Each of these control lines connects to an air switching valve 211, which receives the compressed air via an air supply line 212 which may, for example, draw air from a ring main of the gas turbine engine. The ring main in turn can draw its supply from compressed air bled from one of the compressors of the engine. Any excess air can be vented overboard via an exhaust line 213. The dimensions of the air actuator, and the source of the compressed air supplied to it, may be selected to ensure that the air actuator on its own cannot exceed the threshold force required to operate the mechanical linkage. Alternatively, the air actuator can be actively controlled (e.g. using an EEC discussed below, and appropriate sensors and feedback loops) to prevent the threshold force being exceeded. The fueldraulic actuator 204 can then provide the residual force that is required to operate the mechanical linkage, as well as providing accurate control. The air actuator can be a non-flowing (aside from leakage) air actuator. This can reduce the amount of air consumed by the air actuator to reduce negative effects on engine fuel efficiency.

To operate each actuator 204, 214, respective fluid is provided via an appropriate one of the control lines to one of the chambers of the actuator. For example, pressurised fuel may be provided via the first control line 206 of the fueldraulic actuator 204 to pressurise the first chamber 205. The pressure acts on the piston 209, and thence the piston shaft 221, to urge the mechanical linkage 210 in a given direction. At the same time, compressed air may be provided via the second actuator's first control line 216 to its respective first chamber 215. The increased pressure within this chamber acts on the respective piston 219, and thence the respective piston shaft 222, to urge the linkage in the same direction.

Therefore the air actuator 214 and fueldraulic actuator 204 both provide respective actuator forces on the mechanical linkage 210. As previously mentioned, the magnitude of either of these forces in isolation may be less than the threshold force needed to operate the linkage. However the combination of the two actuator forces is greater than the threshold force. In particular, the magnitude of the actuator force provided by the air actuator alone may be close to, but less than, the threshold force. As a result, only a relatively small actuator force may be needed from the fueldraulic actuator in order to surpass the threshold force and operate the linkage. In this way, the fueldraulic actuator can be used to provide accurate fine control of the mechanical linkage, but the level of the actuation required from the pressurised fuel can nonetheless be substantially reduced.

The fueldraulic valve 201 and air switching valve 211 may be connected by a control link 220, which can be, for example, a hydraulic, mechanical, or electrical link. This can allow the valves to work in combination, and ensure that the respective pistons 209, 219 move in unison. The engine typically has EEC and this may thus need to control directly only the fueldraulic valve. However, another option is for the EEC to have respective control channels for both the fueldraulic valve and the air switching valve, in which case the link 220 may not be needed.

Figure 3:
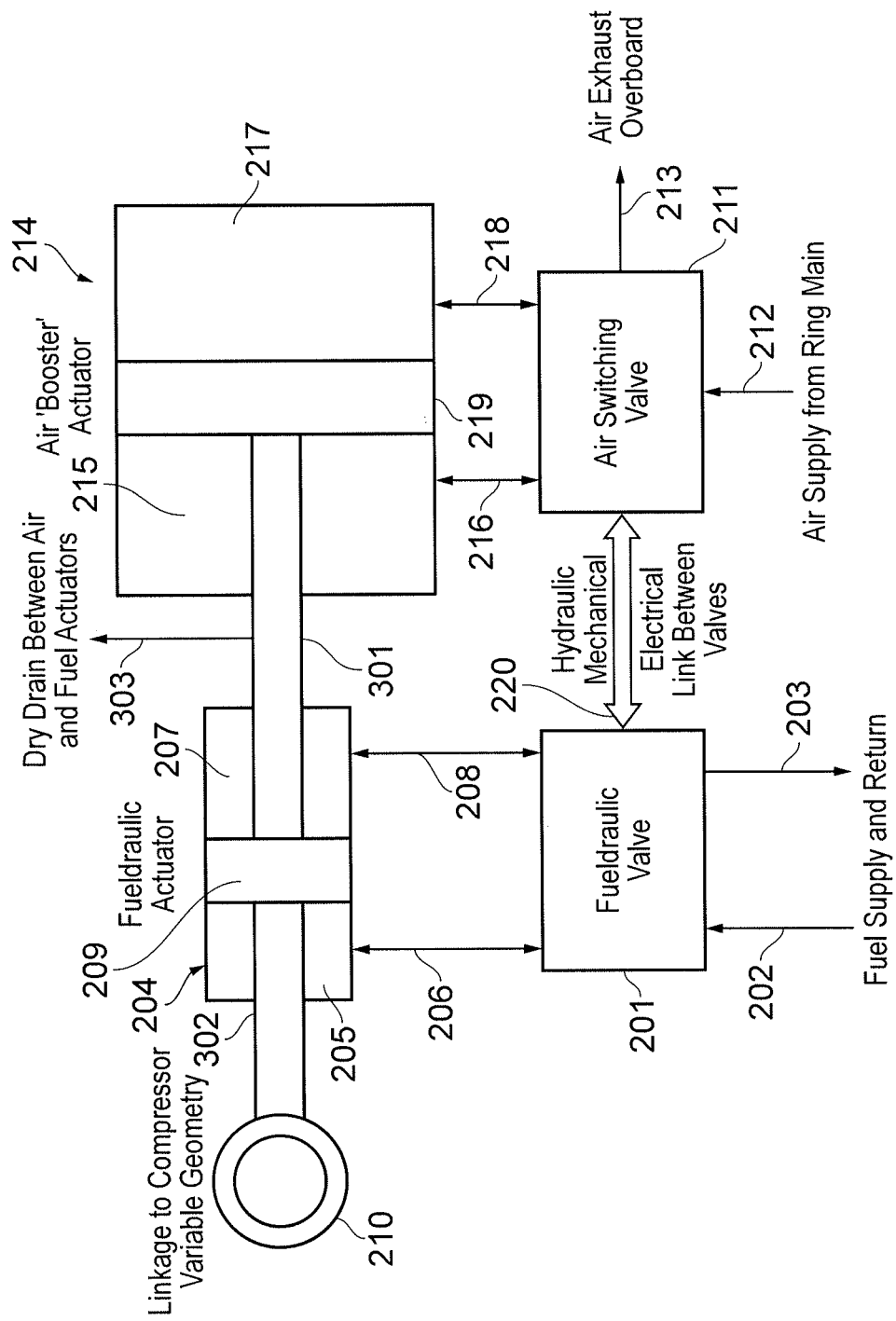
FIG. 3 shows a schematic of a variant system for controlling the geometry of a variable geometry compressor.

FIG. 3 shows a variant system for controlling the geometry of the compressor. It shares many features with the previous system. Reference numerals are reused for features common to both systems and descriptions of such features are not repeated.

The system shown in FIG. 3 includes a shared piston shaft, which comprises an inter-actuator piston shaft portion 301 and an actuator-to-linkage piston shaft portion 302. More particularly, the inter-actuator piston shaft portion joins the fueldraulic 209 and air 219 actuator pistons, while the actuator-to-linkage piston shaft portion extends from the fueldraulic actuator piston to the linkage. This allows the piston arrangement in the system to be integrated, resulting in a single piston shaft connection to the mechanical linkage 210.

The system in FIG. 3 also includes a dry drain between the air and fueldraulic actuators, which helps to prevent fluid leakage between the pressurised fuel and compressed air parts of the system.

As an example of a variant employing the invention, instead of fuel another incompressible fluid may be used e.g. oil. If the invention were used in a marine gas turbine engine or an industrial gas turbine engine water could be used. In general, the incompressible fluid actuator (whatever that fluid may be) should provide precise control and some of the motive power to operate the actuator. Similarly, instead of air, an alternative compressible fluid could be used. Generally the compressible fluid actuator should provide the majority of the motive power to operate the actuator.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A system for controlling the geometry of a variable geometry compressor, the system having: a mechanical linkage operable to vary the compressor geometry; a first fluid-powered actuator arranged to operate the linkage and configured to be powered by a pressurized supply of an incompressible fluid; and a second fluid-powered actuator arranged to operate the linkage and configured to be powered by a pressurized supply of a compressible fluid; wherein the first and second actuators are further arranged to operate in combination on the mechanical linkage such that a first actuator force exerted by the first actuator on the mechanical linkage sums with a second actuator force exerted by the second actuator on the mechanical linkage.

2. The system of claim 1, wherein the mechanical linkage only operates to vary the compressor geometry when an actuator force equal to or greater than a threshold actuator force is exerted on the linkage, and wherein the second actuator is arranged such that the second actuator force is less than the threshold actuator force.

3. The system of claim 1, further including a controller which is arranged to control the second actuator such that the second actuator force exerted by the second actuator on the mechanical linkage is less than a threshold actuator force required to vary the compressor geometry.

4. The system of claim 3, wherein the controller is further arranged to control the first and second actuators such that the magnitude of the first actuator force is less than the second actuator force.

5. The system of claim 1, wherein the incompressible fluid is fuel.

6. The system of claim 1, wherein the compressible fluid is air.

7. The system of claim 1, wherein each actuator has a respective piston-in-cylinder arrangement defining a first chamber for the respective fluid corresponding to a first direction of actuation and a second chamber for the respective fluid corresponding to an opposite, second direction of actuation.

8. The system of claim 7, wherein when the respective fluid is supplied to the first chamber of one of the actuators, the other fluid is supplied to the first chamber of the other actuator, such that the first and second actuator forces are exerted in the same direction of actuation.

9. The system of any of claim 7, wherein the mechanical linkage only operates to vary the compressor geometry when an actuator force equal to or greater than a threshold actuator force is exerted on the linkage, wherein the second actuator is arranged such that the second actuator force is less than the threshold actuator force, and wherein the first and second chambers of the second fluid actuator are dimensioned such that the maximum magnitude of the second actuator force is less than the threshold actuator force.

10. The system of claim 1, wherein the compressor comprises one or more variable vanes, and the actuators vary the angle of the vanes.

11. The system of claim 1, wherein the mechanical linkage includes a unison ring.

12. The system of claim 1, wherein the pressurized supply of the incompressible fluid to the first actuator is controlled by a first control valve and the pressurized supply of the compressible fluid to the second actuator is controlled by a second control valve.

13. A variable geometry compressor having the system of claim 1.

14. A gas turbine engine including the variable geometry compressor of claim 13.

15. The gas turbine engine of claim 14, wherein the compressible fluid is compressor bleed air from the engine, and the incompressible fluid is fuel for powering the engine.

* * * * *